United States Patent [19]

Antila et al.

[11] Patent Number: 5,687,815
[45] Date of Patent: Nov. 18, 1997

[54] APPARATUS FOR SUPPLYING LUBRICANT ALTERNATIVELY TO OPPOSITE SIDES OF A LUBRICANT DISPENSER METERING PISTON

[75] Inventors: Kari Antila, Korpilahti; Ismo Lehtinen, Muurame, both of Finland

[73] Assignee: Safematic Oy, Muurame, Finland

[21] Appl. No.: 693,135

[22] PCT Filed: Feb. 14, 1995

[86] PCT No.: PCT/FI95/00066

§ 371 Date: Aug. 13, 1996

§ 102(e) Date: Aug. 13, 1996

[87] PCT Pub. No.: WO95/22031

PCT Pub. Date: Aug. 17, 1995

[30] Foreign Application Priority Data

Feb. 14, 1994 [FI] Finland .................... 940685

[51] Int. Cl.⁶ ............................ F16N 27/00
[52] U.S. Cl. ................... 184/7.4; 137/624.14
[58] Field of Search ............ 184/7.4, 8; 137/624.14

[56] References Cited

U.S. PATENT DOCUMENTS

| | | | |
|---|---|---|---|
| 2,126,451 | 8/1938 | Creveling | 184/7.4 |
| 3,172,578 | 3/1965 | Kemp | 137/624.14 |
| 4,632,361 | 12/1986 | Callison | 137/624.14 |
| 5,147,016 | 9/1992 | Antila | |

FOREIGN PATENT DOCUMENTS

| | | | |
|---|---|---|---|
| 66978 | 8/1984 | Finland | F16N 25/00 |
| 147 814 | 11/1954 | Sweden | |
| 340 828 | 6/1972 | U.S.S.R. | |
| 1 570 009 | 6/1980 | United Kingdom | |

*Primary Examiner*—Thomas E. Denion
*Attorney, Agent, or Firm*—Cushman Darby & Cushman Intellectual Property Group of Pillsbury Madison & Sutro LLP

[57] ABSTRACT

An arrangement in connection with a lubricant dispenser including a frame, which frame contains a metering cylinder and a metering piston moving therein as well as structure for conducting lubricant alternately to each side of the metering piston. The structure for conducting lubricant includes a spindle positioned in the cylinder and provided with passages remaining open during pressurization, the spindle being arranged to move in the cylinder so as to permit flow of lubricant in consequence of a movement of the spindle alternately either via a control valve to one side or the other of the metering piston or directly to one side or the other of the metering piston, depending on dispenser. To improve selection of material, the spindle is arranged to move only by rotating around its longitudinal symmetry axis. The rotary movement of the spindle is arranged to be provided by a separate turning part moving back and forth and rotating influenced by lubricant pressure and spring force.

9 Claims, 3 Drawing Sheets

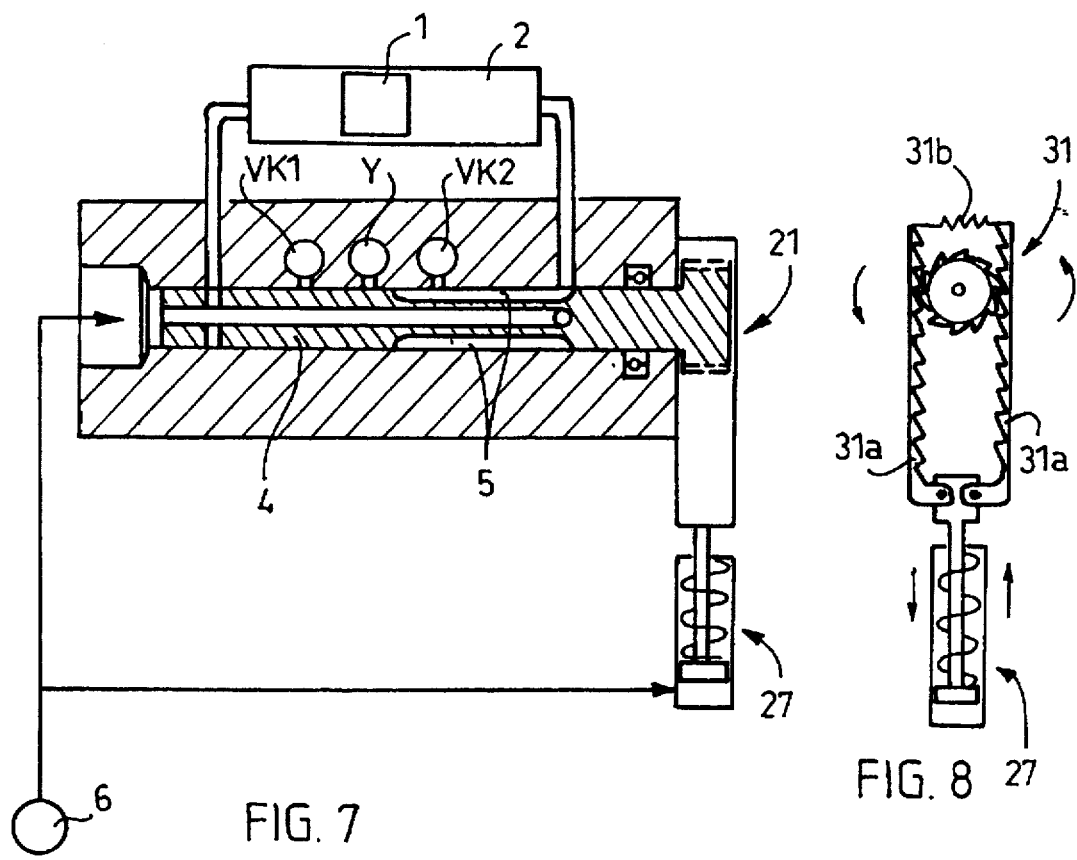
FIG. 7
FIG. 8
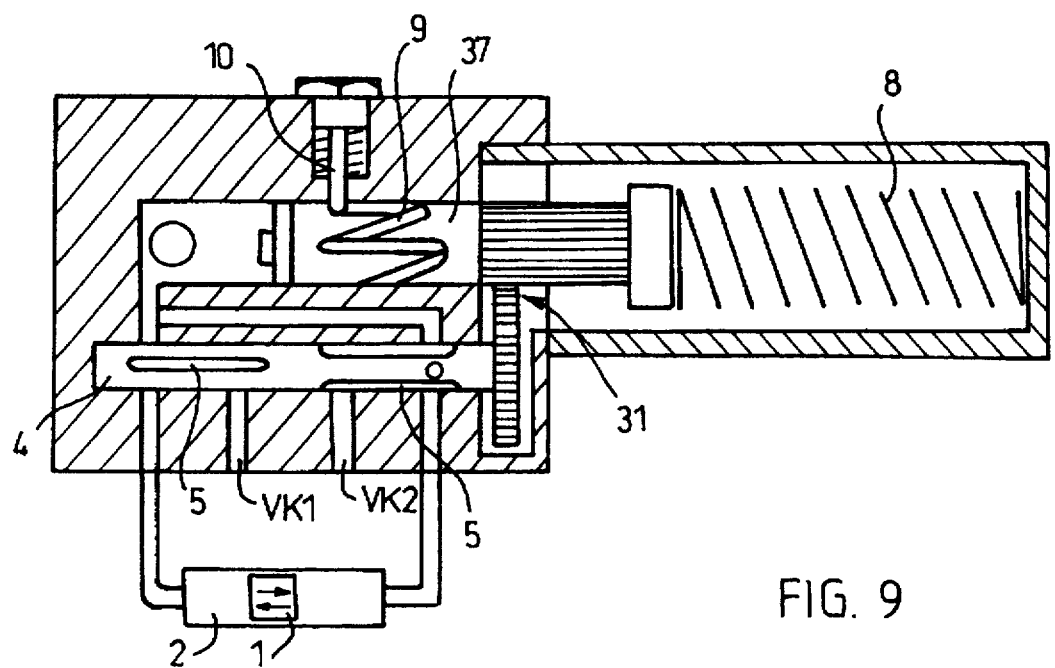
FIG. 9

APPARATUS FOR SUPPLYING LUBRICANT ALTERNATIVELY TO OPPOSITE SIDES OF A LUBRICANT DISPENSER METERING PISTON

This application claims benefit of international application PCT/ FI95/00066 filed Feb. 14, 1995.

BACKGROUND OF THE INVENTION

The invention relates to an arrangement in connection with a lubricant dispenser comprising a frame, which frame contains a metering cylinder and a metering piston moving axially therein as well as means for conducting lubricant alternately to both sides of the metering piston, the means for conducting lubricant comprising a spindle positioned in the cylinder and provided with passages remaining entirely open during the whole pressurization, the spindle being arranged to move in the cylinder so as to permit flow of lubricant in consequence of a movement of the spindle alternately either via a control valve to one side or the other of the metering piston or directly to one side or the other of the metering piston, depending on dispenser, whereby the spindle is arranged to move Only by rotating around its longitudinal symmetry axis.

It is previously well-known in the field to lubricate several objects of lubrication from a common fixed lubricant source. In such a centralized lubricating system, a required number of dispensers are mounted in the vicinity of the objects of lubrication, one dispenser usually attending to two objects of lubrication. The dispensers are connected with pipes to a pump feeding lubricant at intervals determined by a control center to the dispensers metering a desired quantity of lubricant and pressing that quantity of lubricant to the object to be lubricated. A control valve in the dispenser conducts the lubricant metered by the metering piston to each object of lubrication alternately.

Most of the previously known centralized lubricating systems are two-pipe systems, in which the dispensers are connected to the pump always with two main pipes through which lubricant is fed into each dispenser alternately. Movements of the control valve, which are necessary for conducting a quantity of lubricant alternately to different objects of lubrication, then occur influenced by an alternate pressurization of the main pipes in such a way that the pressure of one main pipe pushes the control valve to another position and the pressure of the other main pipe pushes the control valve back. A drawback of such a system is that two pipes have to be mounted between the pump and the dispensers. Such a double piping is, however, expensive and increases the mounting work.

To eliminate the above drawback, dispensers connectable to a pump by means of one manifold have been developed, through which the drawbacks of double piping can be removed. As an example of such dispensers and arrangements can be mentioned a solution disclosed in the Finnish Patent 66 978. A drawback of this solution is, however, that it is not very well adapted to all lubricants. Inconveniences may occur with difficult greases, i.e. greases in which oil and soap tend to be separated from each other. Another drawback is an underpressure on one side of the dispenser caused by a difference in the surface area of the control valve, for instance.

To eliminate the above drawbacks, a solution disclosed in-the Finnish Patent Application 912 786 has been developed. This solution functions in most situations completely faultlessly. In some situations, however, a drawback is that hardening and surface treatment of spindle material cannot always be performed in the best possible manner. The reason is that a compromise has to be done at the manufacture of the spindle, as far as moving and valve properties are concerned, due to which the final result is not necessarily the best possible in all situations.

SUMMARY OF THE INVENTION

The object of the invention is to provide an arrangement by means of which the drawbacks of the previously known solutions can be eliminated. This has been achieved by means of the arrangement according to the invention, which is characterized in that the rotary movement of the spindle is arranged to be provided by means of a separate turning part moving back and forth and rotating influenced by lubricant pressure and spring force.

An advantage of the invention is primarily that the materials, hardenings, surface treatments and manufacturing method of the turning part can be selected irrespective of each other in the best possible manner, so that these parts function in the best possible manner, which means that the spindle functions in the best possible manner as a valve part and the turning part as a turning part of the spindle, respectively. This possibility of selecting provides the best possible safety in operation and the optimal economy of the production. Another advantage of the invention is that the arrangement is preferably adapted to all kinds of lubricants, also the above-mentioned difficult greases. Additionally, the lubrication takes place on both sides of the dispenser at full pressure of the main pipe by controlling conventional two-pipe system dispensers. A further advantage is that the arrangement of the invention is simple and quick-mounted. Accordingly, the arrangement of the invention can be used preferably in connection with conventional dispensers intended for a two-pipe system. Then the utilization of the invention will be advantageous, it is not absolutely necessary to plan and manufacture a specific dispenser for the utilization of the invention, but dispensers manufactured and used at present can be used. By means of the invention, however, it is also possible to provide a structure replacing the traditional two-pipe system dispenser used previously. Similarly to the arrangement of the Finnish Patent Application 912 786, the invention also maintains all previously known advantages of the one-pipe system, eliminates the deficiencies and drawbacks therein and provides additionally a full pressurization on both sides of the dispenser and an adaptability to all kinds of lubricants. Further achievements are that grease of NLGI-2 class can be used, the system can be adjusted and expanded, electricity is not needed, a residual pressure is accepted to a great extent and big quantities can be used and, moreover, an adaptability to all kinds of lubricants is achieved.

BRIEF DESCRIPTION OF THE DRAWINGS

The invention will be explained in the following in greater detail by means of preferred embodiments shown in the attached drawings, in which:

FIG. 7 shows a general sectional view of a third embodiment of the arrangement according to the invention, FIG. 8 shows a general view of an alternative implementation of a detail of a turning part of the arrangement according to the invention and FIG. 9 shows a general sectional view of a fourth embodiment of the arrangement according to the invention.

DETAILED DESCRIPTION

Figure 1:
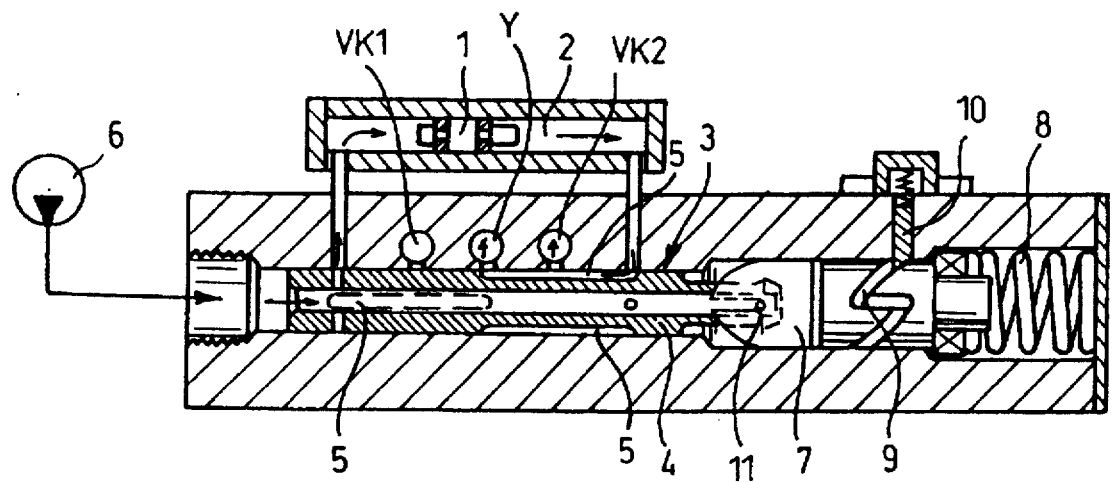
FIGS. 1 and 2 show general sectional views of a first embodiment of an arrangement according to the invention at different stages of operation.
Figure 2:
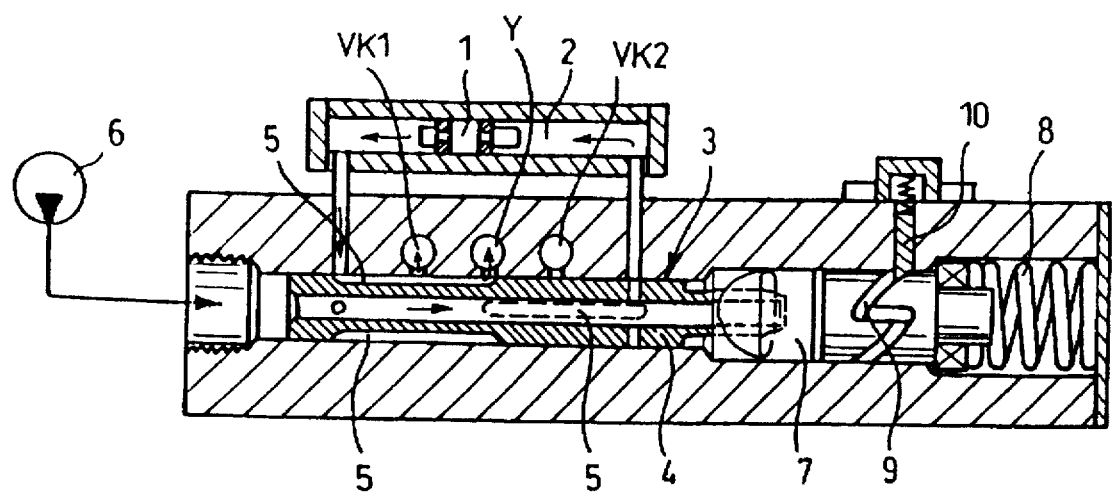
Figure 3:
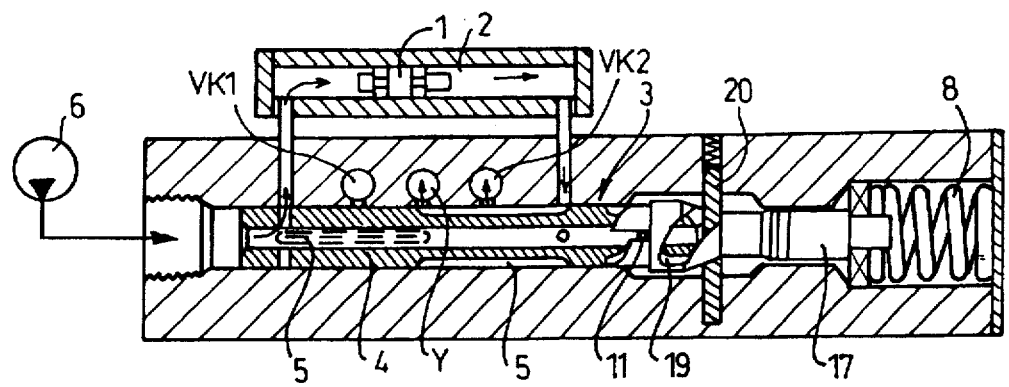
FIGS. 3 to 6 show general sectional views of a second embodiment of the arrangement according to the invention at different stages of operation.
Figure 4:
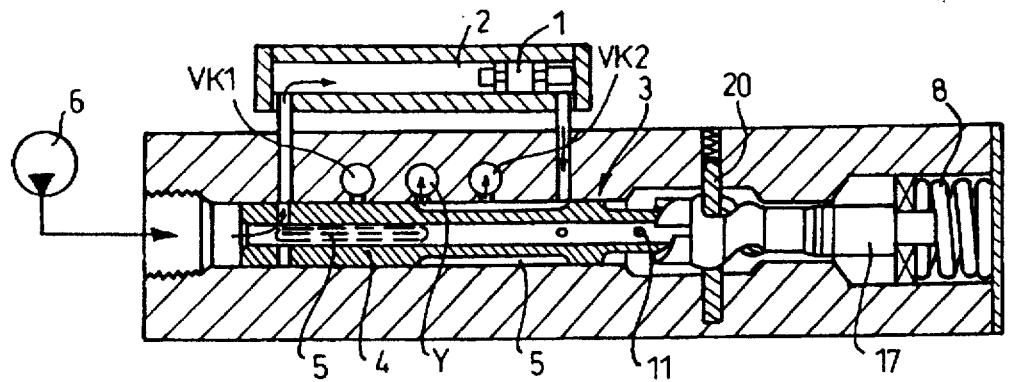
Figure 5:
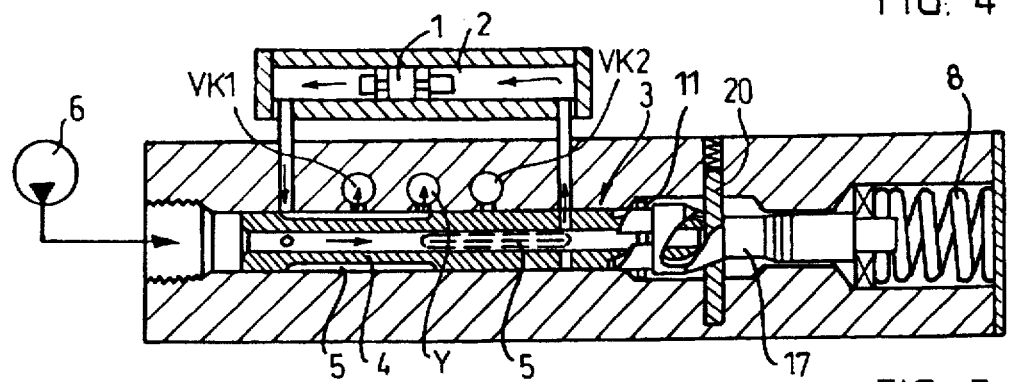
Figure 6:
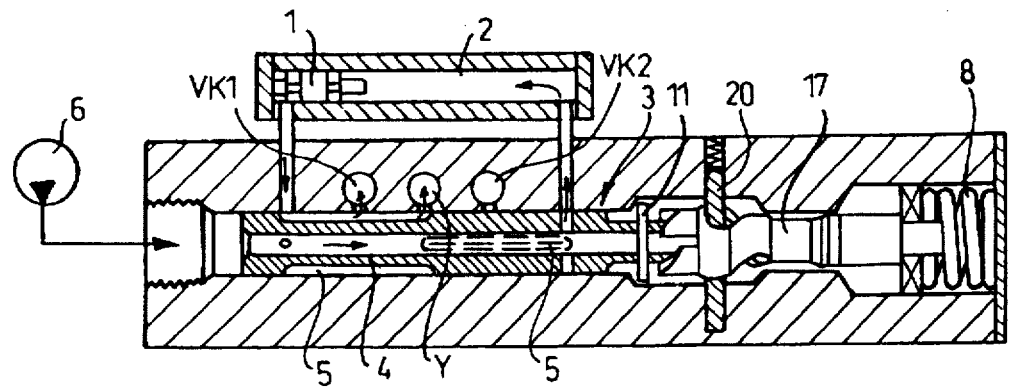

FIGS. 1 and 2 show a first preferred embodiment of an arrangement according to the invention. Reference numeral 1 in the FIGS. 1 and 2 indicates a metering piston positioned in a metering cylinder 2 formed in a frame. The metering piston 1 is arranged to move axially in the metering cylinder 2. Reference numeral 3 in the figures indicates a cylinder, in which is positioned a spindle 4. The spindle 4 is provided with passages 5 remaining open during the whole pressurization. The spindle 4 is arranged to move in the cylinder so as to permit flow of lubricant fed by a pump 6 of the lubricating system in a consequence of a movement of the spindle 4 either via a control valve to one side or the other of the metering piston 1 or, as in the FIGS. 1 and 2, directly to one side or the other of the metering piston 1, depending on dispenser. The expression "depending on dispenser" signifies that the arrangement according to the invention can be connected to a conventional two-pipe system dispenser fully known in the field in such a way that the arrangement according to the FIGS. 1 and 2, for instance, feeds lubricant via the control valve in the dispenser into the metering cylinder of the dispenser. This is, however, not the only possibility, but a specific dispenser can be formed in connection with the arrangement of the invention, in which case the metering cylinder 2 can be positioned in the same frame as the assembly constituted by the cylinder 3 and the spindle 4. Accordingly, the situation is quite identical to the previously mentioned Finnish Patent Application 912 786. The metering cylinder 2 can be joined to the arrangement according to the invention as a loose connection according to the FIGS. 1 and 2. Consequently, the invention can be applied rather far in connection with the prior art technique, for instance in connection with renewals of equipments, but it is also possible to form a completely specific construction assembly suitable for new objects, for instance. For the sake of clarity, the figures show the metering cylinder 2 only in principle, due to which all alternatives can be described by means of the same figures.

According to the essential idea of the invention, the spindle 4 of the arrangement is arranged to move only by rotating around its longitudinal symmetry axis. The rotary movement of the spindle 4 is arranged to be provided by a separate turning part 7 moving back and forth and rotating influenced by lubricant pressure and spring force. The lubricant pressure is provided by the pump 6 and the spring force by a spring 8, respectively.

The arrangement according to the FIGS. 1 and 2 functions in principle in the following manner. The lubricant pressure coming from the pump 6 moves the turning part 7 to the right against the force of the spring 8. Simultaneously, flow of lubricant is permitted through the passages of the spindle 4 and the surrounding frame to the left side of the metering piston 1, as shown in FIG. 1 by means of arrows. The spindle remains accurately in its place at this stage. It shall be noted that these passages are entirely open during the whole time. On account of that the pressure rises, the metering piston 1 moves to the right, due to which the quantity of lubricant on the right side of the metering piston moves through the passages 5 of the spindle 4 directly to an object of lubrication VK2 or to a common object of lubrication Y. The lubricant moving in the above manner is indicated by arrows in FIG. 1. The expression VK2 means in this connection naturally that a pipe is joined to that point, through which pipe lubricant is permitted to flow to the point of lubrication, e.g. to a bearing of a roll of a paper machine etc.

With the pressure rising to its maximum value, the separate turning part 7 propagates to the right by the length of a groove 9 guiding the part and a guide pin 10 supported on the groove. After the pump 6 has stopped, the pressure of the system begins to drop and the turning part 7 starts moving to the left influenced by the spring 8. When moving to the left, the turning part simultaneously rotates around its longitudinal symmetry axis due to the common effect of the groove 9 and the guide pin. When rotating in the above manner, the turning part 7 is arranged to grip with a counter-surface a pin 11 positioned at the spindle 4, whereby the spindle 4 rotates with the turning part during its return movement. The spindle 4 can be arranged to turn for instance 90 degrees, the result being a situation according to FIG. 2. In the example of the figure, a sliding contact between the spindle 4 and the turning part 7 is formed by means of a slot and a pin, due to which the turning part may slide axially away from the spindle influenced by the pressure and simultaneously rotate around the spindle during its return movement, as shown above. This is, however, not the only possibility, for a sliding contact between the spindle and the turning part may also be realized by means of a sliding groove structure. Then, for instance, a groove structure outside the spindle slides against the inside groove structure of the turning part of the spindle and permits an axial propagation of the turning part during pressurization and a rotation around the spindle during the return movement. The turning part can be arranged to turn the spindle also during a movement caused by pressurization. This function is provided e.g. by forming the groove 9 and the pin 11 in such a way that the turning part rotates during said movement.

After the pump 6 has restarted, the turning part 7 moves to the right again and lubricant is permitted to flow through the passages of the spindle 4 to the right side of the metering piston, as shown by means of arrows in FIG. 2. The quantity of flowing lubricant moves the metering piston 1 to the left, and therefore, lubricant moves from the left side of the piston through the passages to an object of lubrication VK1 or to the common object of lubrication Y.

After the pressurization has ceased, the spring 8 presses the turning part back to the left, due to which the turning part turns the spindle 4 to a new starting situation, i.e. in this case to the situation of FIG. 1.

FIGS. 3 to 6 show a second preferred embodiment of the arrangement according to the invention. This embodiment differs from the embodiment of the FIGS. 1 and 2, as far as the implementation of the turning part is concerned. In the example of the FIGS. 3 to 6, the pin controlling the movement of the turning part extends through the turning part via a profiled opening made in the turning part.

The turning part is indicated in the embodiment according to the FIGS. 3 to 6 by reference numeral 17, the groove is indicated by reference numeral 19 and the guide pin by reference numeral 20. As to the rest, the reference numerals used in the FIGS. 3 to 6 are identical to those used in the FIGS. 1 and 2.

The embodiment of the FIGS. 3 to 6 functions in principle in the following manner. After the pump 6 has started, lubricant begins to flow to the left side of the metering piston 1, due to which the metering piston pushes lubricant from its right side through the passages of the spindle 4 to the object of lubrication VK2 or to the common object of lubrication Y. The lubricant flow is indicated by arrows in FIG. 3. With the pump operating and the pressure rising, the turning part 17 also begins to move to the right. Under common influence of the profiled form of the turning part 17 and the guide pin 20, the turning part 17 then turns in such a way that the turning part 17 is in its extreme position to the right when the pressurization has reached the state according to FIG. 4. When the pump 6 stops and the pressure drops, the turning part 17 begins to move to the left influenced by the spring 8, whereby the turning part, at the same time as it rotates under common influence of the guide pin 20 and the groove 19 provided with profiled form, grips the pin 11 joined to the spindle 4 and rotates around the spindle in the same way as described above in connection with the example of the FIGS. 1 and 2.

The operation continues after the steps described above from the situation of FIG. 5, when the pressurization takes place through the passages of the spindle 4 to the right side of the metering piston 1. When moving to the left in this situation, the metering piston 1 removes from its left side a quantity of lubricant to the object of lubrication VK1 or to the common object of lubrication Y. During pressurization, the turning part 17 propagates to a position according to FIG. 6, from which the turning part 17 during pressure drop takes along the spindle 4 and turns it in the manner described above to a new starting situation, which is a situation according to FIG. 3.

In the above examples, the turning part is arranged in an axial position with respect to the spindle 4, i.e. the turning part is arranged to form an extension of the spindle and additionally in such a way that the spindle and the turning part are in direct contact with each other during turning operation.

The spindle 4 can be made to turn by different mechanisms. One alternative implementation is shown in FIG. 7. In this embodiment, the spindle 4 is turned by means of a cylinder element 27. The force turning the spindle can be transmitted for instance by means of a crank mechanism 21. Instead of a crank mechanism, any other suitable mechanism can naturally be used, e.g. a gear rack principle 31 shown in FIG. 8, comprising gear rack parts 31a and a gearwheel part 31b.

The spindle 4 and the turning part rotating around the spindle can also be arranged at different levels. Such an arrangement is shown in FIG. 9. In FIG. 9, the turning part is indicated by reference numeral 37. As to the rest, the reference numerals used in FIG. 9 are identical to those in the examples of FIGS. 1 and 2. In this embodiment, the turning part 37 and the spindle 4 are joined together by a suitable transmission means 31, e.g. gearwheels, a chain, a cogged belt, a crank mechanism described in connection with FIG. 7, etc. As to flow functions, the example of FIG. 9 corresponds essentially to the example of the FIGS. 3 to 6, for instance.

The above embodiments are by no means intended to restrict the invention, but the invention can be modified within the scope of the claims completely freely. Thus it is obvious that the embodiment according to the invention or its details do not necessarily need to be exactly such as illustrated in the figures, but solutions of some other kind are also possible. For instance, the groove-pin-arrangement providing the rotation of the spindle can be realized in many different ways. For instance, a use of a fixed or spring-loaded pin, a pin provided with a ball-shaped end, a pin provided with a rounded end etc., a round-bottom groove, a groove provided with a spring means, a groove having a varying depth etc. is possible.

We claim:

1. Apparatus for supplying lubricant alternatively to opposite sides of a lubricant dispenser metering piston, comprising;

a frame containing a metering cylinder, a metering piston axially movably received in said metering cylinder, and means for conducting lubricant alternately to both sides of the metering piston;

said means for conducting lubricant comprising a second cylinder; a spindle positioned in said second cylinder and provided with passages remaining entirely open during the whole of pressurization;

said spindle being arranged to move in said second cylinder so as to permit flow of lubricant in consequence of a movement of the spindle alternately to one side or the other of the metering piston the spindle being arranged to move only by rotating around its longitudinal symmetry axis; and a separate turning part moving back and forth and rotating influenced by lubricant pressure and spring force for rotating said spindle.

2. The apparatus according to claim 1, wherein:

said turning part is arranged in an axial position with respect to said spindle.

3. The apparatus according to claim 1, wherein:

said spindle is arranged to be rotated during each return movement of said turning part.

4. The apparatus according to claim 1, wherein:

said spindle is arranged to be rotated during each movement of said turning part caused by pressurization.

5. The apparatus according to claim 3, wherein:

said turning part has a surface, and rotary movement of the return movement of the turning part is provided by a groove formed in said surface of said turning part and a pin penetrating into said groove.

6. The apparatus according to claim 5, wherein:

said groove is provided as an opening in said turning part and said pin extends through said turning part via said opening.

7. The apparatus according to claim 1, wherein:

said turning part comprises a crank mechanism.

8. The apparatus according to claim 1, wherein:

said turning part comprises a gear rack mechanism.

9. The apparatus according to claim 1, wherein:

said turning part is arranged at a level different from that of said spindle, and said turning part is joined to said spindle by a transmission.

* * * * *